Dec. 3, 1940.   H. V. PUTNAM   2,223,531
PROTECTIVE DEVICE FOR ELECTRICAL APPARATUS
Original Filed July 21, 1936
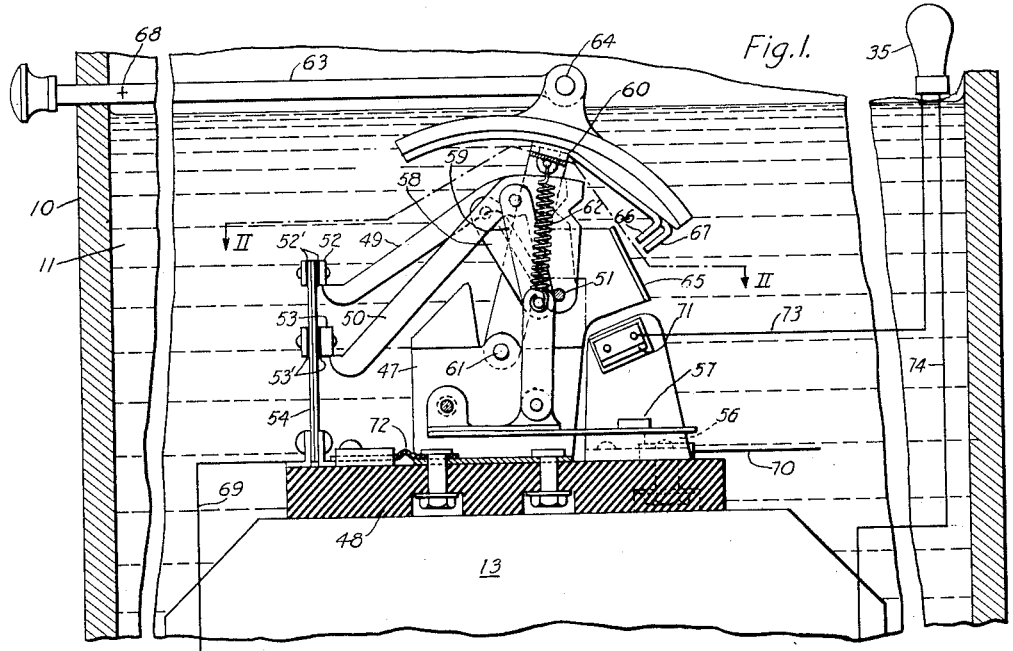
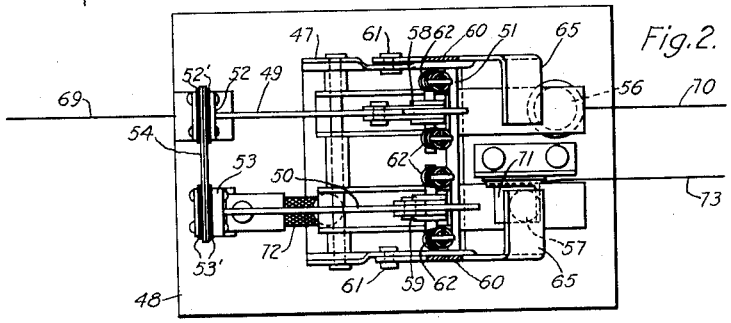
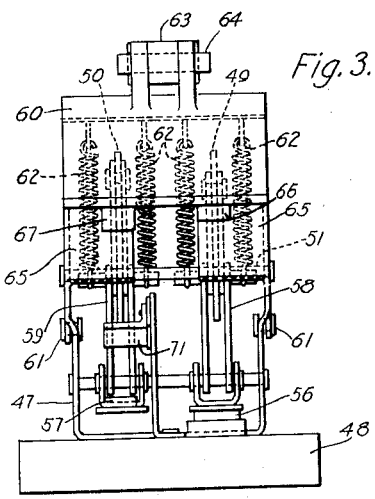
WITNESSES:
INVENTOR
Henry V. Putman
BY
ATTORNEY Patented Dec. 3, 1940

2,223,531

UNITED STATES PATENT OFFICE 2,223,531

PROTECTIVE DEVICE FOR ELECTRICAL APPARATUS

Henry V. Putman, Sharon, Pa., assignor to Westinghouse Electric & Manufacturing Company, East Pittsburgh, Pa., a corporation of Pennsylvania Original application July 21, 1936, Serial No. 91,654. Divided and this application February 4, 1939, Serial No. 254,613

29 Claims. (Cl. 200—116)

The invention relates generally to protective devices for electrical apparatus and more particularly to circuit breakers for use in transformers. This application is a division of my application Serial No. 91,654, filed July 21, 1936.

In distribution systems, electrical apparatus, such as transformers, regulators, etc., are often located in places remote from the central power stations. In such installations, transformers and other apparatus operate for months without inspection because of the difficulty and cost of making inspections which will give useful information on load conditions.

Heretofore the inspection or testing of transformers and other electrical apparatus to ascertain whether or not overload conditions prevailed required experienced, highly paid men. When such inspections and tests are made regularly, the cost of operation is greatly increased, and if neglected, failure of the apparatus, due to overloading, with expensive interruptions of service may result.

The object of this invention is to provide for indicating predetermined operating conditions in electrical apparatus.

It is also an object of the invention to provide for facilitating the inspection of electrical apparatus in distribution systems to maintain safe operating conditions.

A further object of the invention is to provide a circuit breaker having a thermally responsive element operable to cause opening of the circuit of the apparatus protected upon the occurrence of a predetermined condition and also operable to give an indication, prior to the occurrence of the condition, that it has almost been reached.

An additional object of the invention is to provide a circuit breaker having a trip mechanism including a current or thermally responsive element such as a bimetal and two elements actuable, upon actuation of the current or thermally responsive elements, at different times.

Other objects of the invention will in part be obvious and in part appear hereinafter.

The invention accordingly is disclosed in the accompanying drawing and, comprises the features of construction, combination of elements and arrangement of parts which will be exemplified in the structure hereinafter set forth and the scope of the application of which will be indicated in the claims.

For a fuller understanding of the objects of the invention, reference may be had to the following detailed description taken in connection with the accompanying drawing, in which:

Figure 1 is a view partly in section and partly in side elevation of a part of a transformer showing protective apparatus applied thereto in accordance with the teachings of this invention;

Fig. 2 is a plan view of the protective device or circuit breaker taken in section on the line II—II of Fig. 1; and Fig. 3 is a view in end elevation of the protective device or circuit breaker.

Referring now to the drawing and Figure 1 in particular, a transformer case 10 is illustrated as partly filled with a suitable dielectric 11. A sufficient quantity of dielectric liquid is employed to completely immerse the transformer core 13.

In the operation of transformers, it is desirable to protect them from overload conditions of all kinds. Under some operating conditions, a transformer may be subjected to a gradually increasing load which develops into a continuous overload. If the load is increased slowly and gradually, the temperature of the oil or other dielectric in the transformer follows closely the temperature of the coils or copper. Under other operating conditions a transformer may be overloaded because of a sudden rush of current caused by some abnormal condition such as a short circuit. When an overload of this kind occurs, the copper temperature rises much more quickly than the oil temperature, and in order to protect the transformer, means must be provided which responds to the copper temperature and functions to indicate that a predetermined copper temperature has been reached or to effect the operation of some suitable protective device.

In the present invention, in order to protect a transformer a bimetal strip or member, the function of which will be described hereinafter, is employed and either connected in series or shunt circuit relation to carry all or a portion of the current. In mounting the bimetal, it is immersed in the dielectric provided for the coils and thereby subjected to all the changes in temperature of the dielectric.

From the foregoing description, it will be evident that the bimetal employed is affected by both the temperature of the dielectric and the temperature gradient of the metal which is a function of the square of the current. Further the bimetal may be designed to have substantially the same temperature gradient characteristic as the copper of the coils. Therefore, upon changes in the load current, the temperature and movement of the bimetal may be made to follow approximately the changes in the temperature of the copper of the transformer coils.

Assuming that the transformer temperature increases to a predetermined value as a result of overload conditions, then the bimetal strip which is designed to respond to a selected temperature releases a pivoted spring-biased latch and one contact member is actuated into engagement with its cooperating contact member, establishing a circuit through a signal lamp. In this manner, the lamp is connected across the transformer coils and a signal is established to indicate that the transformer has been heated to a predetermined temperature indicating overload conditions.

An inspector can readily see the light from the ground in case the transformer is in an inaccessible place, and can report the condition existing. It is not necessary to have a trained inspector for making such inspections, but anyone living in the community can be employed for such purpose, thus facilitating the patroling of the system. This is of particular value in rural distribution systems.

If the signal lamp indicates that the transformer has been overloaded, it is a warning that it has not sufficient capacity for the load in that section of the system, and depending upon the extent of the overload, a decision may be arrived at as to whether or not the transformer should be changed for one of greater capacity. If the transformer has been seriously overloaded, it is advisable to change it immediately to avoid interruptions in service.

The breaker illustrated on the drawing performs two functions. It controls the signalling circuit and the transformer circuit. These functions may be performed independently, that is, the circuit interrupter may be actuated to establish the signalling circuit independently without interrupting the transformer circuit.

As illustrated in Fig. 1, the circuit interrupter is mounted on a base 48 of "Micarta" or other suitable insulating material. Two independent latch members 49 and 50 are pivotally mounted on a shaft 51 carried by the frame 47. The latch members 49 and 50 are shaped to engage blocks or shoulder members 52 and 53, respectively, carried by the bimetal strip 54. These blocks 52 and 53 are insulated from the bimetal strip by insulation 52' and 53' for a reason that will appear hereinafter.

The bimetal strip is of the well known U-shaped type and is disposed to swing away from the latch members upon a predetermined increase in temperature. As will be observed by reference to Fig. 1, a very small movement of the bimetal strip 54 counter-clockwise will effect a release of the latch 50. In order to release the latch 49 from the block 52, a much longer movement of the bimetal strip 54 is required. The length of movement of the bimetal strip 54 will depend on the temperatures to which it may be subjected. Therefore, provisions may be made for tripping the latches 49 and 50 at any predetermined temperatures. The temperature to which the bimetal is raised will depend on both the current flowing in the transformer circuit and the temperature of the dielectric 11. Therefore, the bimetal really operates in response to a function of the load conditions to which the transformer is subjected.

As shown on the drawing, pivotally mounted contact members 56 and 57 are provided in conjunction with the latches 49 and 50, respectively. The pivotally mounted contact member 56 is connected to the latch 49 by a toggle linkage 58 while the pivotally mounted contact member 57 is connected to the latch 50 by a toggle linkage 59. An actuating or resetting member 60 which is pivoted on the frame at 61 is connected to the pivot point of the linkages by a plurality of springs 62. In this manner the latches and pivotally mounted contact members are disposed to be actuated in the manner of spring biased toggle switches. In order to provide for the operation of the actuating member 60, a pull rod 63 is provided. As shown the pull rod extends through the wall of the transformer case 10 and is pivotally connected at 64 to the actuating member 60.

As shown in Figs. 1 and 2, stop 65 is provided for receiving the latch members 49 and 50 when released. This stop is also utilized to limit the movement of the pivotally mounted contact member 56.

Two inwardly extending projections 66 and 67 are provided on the actuating member 60 to engage the latches 49 and 50, respectively, for resetting them. These projections 66 and 67 are shown disposed in advance of one another but such an arrangement is not essential.

Assuming now that the latches are in the position illustrated in Fig. 1 and that the bimetal is heated to a temperature which causes it to move counter-clockwise and release latch 50, the release of latch 50 as will be disclosed hereinafter connects the signal light 35 across the transformer, indicating that the temperature rise in the transformer has reached a predetermined value. When this condition has been observed, the inspector will report the conditions under which the transformer is operating and steps may be taken to substitute a transformer of the required capacity.

When this report has been made, it is not desired that the signal lamp shall remain lighted. Accordingly, the inspector will operate the resetting member 60 to reset the latch 50. This may be accomplished by operating the pull rod 63 a predetermined distance, that is, the operator will pull the rod 63 outwardly until the mark 68 appears. This resets the latch 50 and also opens the main circuit at contact 56. The operating rod 63 is then pushed in again and the circuit breaker will be reclosed and will be in its normal operating condition without there having occurred an overload condition which would cause the latch 49 to be released.

Referring now to Fig. 1, the operating circuits will be described. When the latches 49 and 50 of the circuit interrupter stand in the position illustrated in Fig. 1, the internal transformer circuit may be traced from conductor 69 through the coil of the transformer to the U-shaped bimetal strip 54, conductor 72, the frame of the interrupter, contact 56 and conductor 70 to the external circuit.

Assuming now that there is a temperature rise in the transformer and that the latch 50 is released, and that the pivotally mounted contact member 57 is drawn upwardly into engagement with the contact member 71 insulatedly carried by the frame 47, then a circuit is established which may be traced through conductor 69 from one coil of the transformer, the bimetal strip 54 and conductor 72, through the pivotally mounted contact 57 to the contact member 71, conductor 73, signal lamp 35, and conductor 74 to the other end of the coil of the transformer.

When both latches 49 and 50 are tripped, the pivotally mounted contact members 56 and 57 are released, the latch 49 serving to interrupt the transformer circuit and the latch 50 serving to establish the signal circuit. The bimetal strip 54 is so designed that the tripping latch 49 is tripped when the transformer is overloaded beyond its rated overload capacity. While the bimetal strip 54 moves slowly in response to the gradual changes in its temperature, the latches 49 and 50, and the contact members 56 and 57 controlled by the latches, move with a quick or snap action as soon as the bimetal strip has moved to the respective points where the latches are released; and the latches and contact members remain in the position to which they have been moved until manually reset by movement of the operating rod 63, even though the bimetal strip 54 has returned to its normal position. When either latch is tripped, its corresponding contact member will be moved irrespective of the position in which the operating rod 63 may be held because the support for the upper end of the toggle link holding the contact will be removed by the movement of the latch. This makes it impossible to manually prevent the contacts from movement to tripped position upon bending of the bimetal 54. When both latches are tripped, they can be reset by pulling the actuating member 60 to the left by means of the pull-rod 63. Both latches may be readily reset in this manner by forcing one beyond its latching position and allowing it to come back after the other latch has been caught on its corresponding block.

In conclusion, it is pointed out that while the illustrated example constitutes a practical embodiment of my invention, I do not limit myself to the exact details shown, since modifications of the same may be considerably varied without departing from the spirit of the invention as defined in the appended claims.

I claim as my invention:

1. In a circuit breaker having a contact member operable to open and closed positions, auxiliary means operable upon the occurrence of a predetermined condition, a plurality of independently movable elements, a control element responsive to predetermined conditions, at least one of said movable elements being operative upon movement of said control element to actuate said auxiliary means and at least one other of said movable elements being operative upon movement of said control element to cause actuation of said contact member from the closed to the open position.

2. In a circuit breaker having a contact member operable to open and closed positions, means for indicating a predetermined current condition in said contact member, a plurality of movable elements, means including a control element for releasably retaining said movable elements in a normal position, at least one of said movable elements being operative when released by said means to actuate said indicating means and at least one other of said movable elements being operative when released by said means to actuate said contact member from the closed to the open position, said last named movable element being releasable subsequent to the release of said first named movable element.

3. In a circuit breaker having a contact member operable to open and closed positions, means for indicating a predetermined condition, a plurality of movable elements, means including a control element responsive to predetermined conditions for releasably retaining said movable elements in a normal position, at least one of said movable elements being operative when released by said means to actuate said indicating means, and at least one other of said movable elements being operative when released by said means to actuate said contact member from the closed to the open position, and operating means for the contact member operable to restore said movable elements to their respective normal positions.

4. In a circuit breaker having a contact member, actuating means including a manually operable control member for moving said contact member to open and closed circuit positions, a contact opening member, an auxiliary device operable upon the occurrence of a predetermined condition, and a control element responsive to predetermined conditions for actuating said contact opening member and said auxiliary device, said control element being operable to actuate said auxiliary device prior to actuating said contact opening member.

5. In a circuit breaker having a contact member, means to operate said contact member to open and closed positions, a contact opening member movable from a normal to a tripped position, indicating means operable from a normal to an indicating position for indicating a predetermined condition, and means including a control element for releasably retaining said contact opening member and said indicating means in their respective normal positions, said means being operable to release said indicating means prior to releasing said contact opening member, and means actuated by said means for operating said contact member to open and closed positions for restoring said contact opening member and said indicating means to their respective normal positions.

6. In combination, a circuit breaker having a contact member, means for operating said contact member to open and closed positions, a contact opening member, means responsive to predetermined conditions for releasably retaining said contact opening member in a normal position, said contact opening member when released by said means in response to a predetermined condition causing movement of said contact member from the closed to the open position, indicating means including a member operable from a normal to an indicating position, said indicating member being releasably retained in the normal position by said means responsive to predetermined conditions, said last named means being operable to release said indicating member for movement to the indicating position prior to releasing said contact opening member.

7. In a circuit breaker, a movable contact member, an operating mechanism including a contact opening member movable from a normal to a tripped position for operating said contact member from the closed to the open position, a movable control element responsive to predetermined conditions, latching means releasably interconnecting said control element and said contact opening member for retaining the latter in its normal position, an auxiliary member movable from a normal to a predetermined position, a second latching means releasably interconnecting said control element and said auxiliary member for retaining the latter in its normal position, said last named latching means being adapted when released to actuate said auxiliary member to the predetermined position.

8. In a circuit breaker, a movable contact member, an operating mechanism including a contact opening member movable from a normal to a tripped position for operating said contact member from the closed to the open position, a movable current responsive element, latching means releasably interconnecting said current responsive element and said contact opening member for retaining the latter in its normal position, an auxiliary member movable from a normal to a predetermined position, a second latching means releasably interconnecting said current responsive element and said auxiliary member for retaining the latter in its normal position, said last named latching means being adapted when released to actuate said auxiliary member to the predetermined position, and means actuated by said operating mechanism for returning said contact opening member and said auxiliary member to their normal positions and for restoring the latching engagement of said latching means with said current responsive element.

9. A trip mechanism for a circuit breaker having means for retaining the contacts of the breaker in the closed position, said retaining means being releasable to open said contacts, a pair of pivoted trip members movable to the tripped position, a movable current responsive element in circuit with said contacts for causing movement of said trip members, one of said trip members being movable in response to movement of said current responsive element for releasing said retaining means to open said contacts, an auxiliary contact member, a cooperating contact therefor, said auxiliary contact member being movable upon movement of the other of said trip members into engagement with said cooperating contact for closing an auxiliary circuit, said second trip member being movable in response to a predetermined current of magnitude less than that required to cause movement of said first trip member.

10. In a circuit breaker having a movable circuit controlling member, and actuating means for moving said circuit controlling member to open or to closed circuit position, in combination, an auxiliary device, a plurality of tripping members independently movable from a normal position to an operative position, means biasing said tripping members to operative position, trip means for normally restraining said tripping members in their normal position, and operable in response to predetermined conditions to release said members, at least one of said tripping members being operative when released to effect actuation of said device and at least one other of said tripping members being operative when released to cause said actuating means to move said circuit controlling member from the closed to the open circuit position.

11. In a circuit breaker having a contact member operable to open or to closed circuit position, in combination, an auxiliary device, a plurality of trip members independently movable from a normal position to an operative position, means biasing said members to operative position, means for releasably restraining said members in their normal position, an electro-responsive trip element operable in response to a predetermined condition to release said trip members, at least one of said trip members being operable when released to effect actuation of said auxiliary device and at least one other of said members being operable when released to cause actuation of said contact member from the closed to the open circuit position.

12. In a circuit breaker having a switch member and actuating mechanism for moving said switch member to open and to closed circuit position, in combination, an auxiliary device, trip means including a trip element movable in response to an overload of predetermined magnitude to effect actuation of said auxiliary device and in response to an overload of different predetermined magnitude to cause said actuating mechanism to move said switch member to open circuit position.

13. In a circuit breaker having a switch member and actuating mechanism including a movable manually operable control member for moving said switch member to open or to closed circuit position, in combination, an auxiliary device, trip means including a trip element movable in response to a predetermined overload condition to effect actuation of said device, and in response to a different predetermined overload condition to cause said actuating mechanism to move said switch member to open circuit position irrespective of the position of said control member.

14. In a circuit breaker having a switch member, operating mechanism including an operating member for moving said switch member to open and to closed circuit position, and a member releasable from a normal position to effect movement of said switch member to open circuit position, in combination, an auxiliary device, trip means including a trip element movable in response to overloads of predetermined magnitude to effect actuation of said auxiliary device and in response to overloads of different predetermined magnitude to effect release of said releasable member to open the circuit, and means operable by said operating member for resetting said auxiliary device and said releasable member.

15. In a circuit interrupter having contact means for opening and closing the circuit, a plurality of movable elements, one of said movable elements being operable to cause said contact means to open the circuit and the other of said movable elements being operable to perform an auxiliary function, a control element responsive to predetermined conditions for causing movement of said movable element for causing opening of the circuit upon the occurrence of a predetermined condition and the same said control element being operable upon the occurrence of a different predetermined condition to cause movement of the other of said movable elements to perform said auxiliary function.

16. In a circuit interrupter having contact means for opening and closing the circuit, a plurality of movable elements, one of said movable elements being operable to cause said contact means to open the circuit and the other of said movable elements being operable to perform an auxiliary function, a control element responsive to predetermined conditions for causing movement of said movable element for causing opening of the circuit upon the occurrence of a predetermined condition and the same said control element being operable upon the occurrence of a different predetermined condition to cause movement of the other of said movable elements to perform said auxiliary function, and a single operating member movable to both reclose said contact means and to reset said movable elements, said operating member being incapable of holding said contact means closed upon the occurrence of the first said predetermined condition.

17. In a circuit interrupter having contact means for opening and closing the circuit, a bimetallic element movable to a predetermined position upon the occurrence of a predetermined overload condition in the circuit, a plurality of movable elements, one of said movable elements being operable to cause said contact means to open the circuit upon movement of said bimetallic element to said predetermined position, and the other of said movable elements being operable when said bimetallic element has moved to a position approaching said predetermined position to cause an indication to be given that said predetermined overload condition in the circuit has been approached.

18. In a circuit interrupter having contact means for opening and closing the circuit, a bimetallic element movable to a predetermined position upon the occurrence of a predetermined overload condition in the circuit, a plurality of movable elements, one of said movable elements being operable to cause said contact means to open the circuit upon movement of said bimetallic element to said predetermined position, and the other of said movable elements being operable when said bimetallic element has moved to a position approaching said predetermined position to cause an indication to be given that said predetermined overload condition in the circuit has been approached, operating means movable to reclose said contact means and to reset said movable elements, and said contact means being movable to open the circuit upon the occurrence of said predetermined overload condition irrespective of the position in which said operating means may be held.

19. In a circuit interrupter having contact means for opening and closing the circuit, a pair of movable elements biased to move to a tripped position and normally held in a set position, one of said movable elements when tripped causing opening of said contact means and the other of said movable elements when tripped causing an auxiliary function to be performed, means responsive to predetermined conditions for causing release of one of said movable elements prior to the release of the other of said movable elements, and operating means movable to reset said movable element which has first moved to tripped position without requiring release of the other movable element.

20. In a circuit interrupter having contact means for opening and closing the circuit, a pair of movable elements biased to move to a tripped position and normally held in a set position, one of said movable elements when tripped causing opening of said contact means and the other of said movable elements when tripped causing an auxiliary function to be performed, means responsive to predetermined conditions for causing release of one of said movable elements prior to the release of the other of said movable elements, a single operating member movable to reset said movable element which has first moved to tripped position without requiring release of the other movable element and also movable to reclose said contact means and reset both of said movable elements when both have been tripped, and said movable element for causing opening of said contact means being operable to cause opening of said contact means irrespective of the position in which said operating member may be held.

21. In electrical apparatus, a first contact means movable to open and close a circuit, a second contact means movable to open and close a second circuit, thermally responsive means connected in an electrical circuit to be heated by the current flow therein, said thermally responsive means including an element which moves slowly in response to the heating of the thermally responsive means, and means for causing said first contact means to be moved with a quick action when said element has moved in one direction to a predetermined point and causing said second contact means to be moved with a quick action when said element has moved in the same direction to a second predetermined point.

22. In electrical apparatus, a first contact means movable to open and close a circuit, a second contact means movable to open and close a second circuit, thermally responsive means including an element which moves slowly in response to the heating of the thermally responsive means, means for causing said first contact means to be moved with a quick action when said element has moved in one direction to a predetermined point and causing said second contact means to be moved with a quick action when said element has moved in the same direction to a second predetermined point, said first and second contact means remaining in the positions to which they have been moved with a quick action upon movement of said element in the opposite direction, and manually operable means for returning said first and second contact means to their original positions.

23. In electrical apparatus, a first contact means movable to open and close a circuit, a second contact means movable to open and close a second circuit, a single device movable in response to a predetermined condition and having latching means movable over at least a certain range in accordance with the magnitude of said condition, said first and second contact means each having a biased latch portion normally held by said latching means, and the latch portion for said first contact means being releasable upon movement of said device in one direction to a predetermined point to cause actuation of said first contact means and the latch portion for said second contact means being releasable upon further movement of said device in the same direction to a second predetermined point to cause actuation of said second contact means.

24. In electrical apparatus, a first contact means movable to open and close a circuit, a second contact means movable to open and close a second circuit, a single device movable in response to a predetermined condition and having latching means movable over at least a certain range in accordance with the magnitude of said condition, said first and second contact means each having a biased latch portion normally held by said latching means, the latch portion for said first contact means being releasable upon movement of said device in one direction to a predetermined point to cause actuation of said first contact means and the latch portion for said second contact means being releasable upon further movement of said device in the same direction to a second predetermined point to cause actuation of said second contact means, and manually operable means operable independently of said device responsive to a predetermined condition for returning said contact means to the position occupied prior to actuation by said device.

25. In electrical apparatus, a first contact means movable to open and close a circuit, a second contact means movable to open and close a second circuit, a single device movable in response to a predetermined condition and having latching means movable over at least a certain range in accordance with the magnitude of said condition, said first and second contact means each having a biased latch portion normally held by said latching means, the latch portion for said first contact means being releasable upon movement of said device in one direction to a predetermined point to cause actuation of said first contact means and the latch portion for said second contact means being releasable upon further movement of said device in the same direction to a second predetermined point to cause actuation of said second contact means, and a single manually operable member movable after actuation of said first contact means to return it to its original position and movable after actuation of both of said contact means to return both of them to their original positions.

26. In a device responsive to predetermined conditions, an element movable in accordance with variations in said conditions, latching means movable by said element over at least a certain range of said variations, a first movable member biased to move and normally retained by said latching means, a second movable member biased to move and normally retained by said latching means, said first movable member being released upon movement of said element in one direction to a predetermined point and said second movable member being released upon further movement of said element in the same direction to a second predetermined point.

27. In a device responsive to predetermined conditions, an element movable in accordance with variations in said conditions, latching means movable by said element over at least a certain range of said variations, a first movable member biased to move and normally retained by said latching means, a second movable member biased to move and normally retained by said latching means, said first movable member being released upon movement of said element in one direction to a predetermined point and said second movable member being released upon further movement of said element in the same direction to a second predetermined point, and a manually operable member movable to return at least one of said movable members to position where it may be retained by said latching means.

28. In a device responsive to predetermined conditions, an element movable in accordance with variations in said conditions, a first movable member, means for causing actuation of said first movable member with a snap action upon movement of said element in one direction to a certain point, a second movable member, and means for causing actuation of said second movable member with a snap action upon additional movement of said element in the same direction to a second point.

29. In a device responsive to predetermined conditions, an element movable in accordance with variations in said conditions, a first movable member, means for causing actuation of said first movable member with a snap action upon movement of said element in one direction to a certain point, a second movable member, means for causing actuation of said second movable member with a snap action upon additional movement of said element in the same direction to a second point, said movable members when actuated each remaining in the position to which it has been actuated even though there is movement of said element in the opposite direction, and manually operable means for returning said movable members to their original positions.

HENRY V. PUTMAN.